US006933452B2

(12) United States Patent
Liu

(10) Patent No.: US 6,933,452 B2
(45) Date of Patent: Aug. 23, 2005

(54) TERMINAL CONNECTION DEVICE FOR SPEAKER

(76) Inventor: Edward Liu, 330 Turnbull Canyon Rd., City of Industry, CA (US) 91745

( * ) Notice: Subject to any disclaimer, the term of this patent is extended or adjusted under 35 U.S.C. 154(b) by 173 days.

(21) Appl. No.: 10/648,679

(22) Filed: Aug. 27, 2003

(65) Prior Publication Data

US 2005/0045459 A1 Mar. 3, 2005

(51) Int. Cl.[7] ........................ H01R 24/00; H01R 33/96; H02B 11/00; H04B 3/00

(52) U.S. Cl. ....................... 200/51 R; 381/81; 381/123; 381/124; 439/189; 439/952

(58) Field of Search ................................ 200/1 R, 5 R, 200/11 R–11 TW, 51 R–51.17, 52 R, 61.58, 284, 520–522; 381/81, 123, 124; 439/507–514, 189, 952

(56) References Cited

U.S. PATENT DOCUMENTS

| | | | | | |
|---|---|---|---|---|---|
| 4,158,114 | A | * | 6/1979 | Butler et al. | 200/1 R |
| 4,363,934 | A | * | 12/1982 | Scholz | 381/109 |
| 4,516,817 | A | * | 5/1985 | Deters | 439/513 |
| 4,596,429 | A | * | 6/1986 | Gierut et al. | 439/510 |
| 4,725,698 | A | * | 2/1988 | Takai et al. | 200/51 R X |
| 5,620,086 | A | * | 4/1997 | Bianca et al. | 200/542 |
| 5,749,458 | A | * | 5/1998 | Bianca et al. | 200/541 |
| 5,753,980 | A | * | 5/1998 | Peterson | 200/51 R X |
| 6,056,592 | A | * | 5/2000 | Hashizawa et al. | 200/51.09 X |

* cited by examiner

*Primary Examiner*—James R. Scott
(74) *Attorney, Agent, or Firm*—Raymond Y. Chan; David and Raymond

(57) ABSTRACT

A terminal connection device is adapted for connecting two voice coils in a speaker between a series connection and a parallel connection wherein the terminal connection device includes a jumper housing and a terminal switch detachably mount thereto. The jumper housing includes a jumper circuit defining a plurality of jumper inlets adapted for electrically connecting with electric outputs of the voice coils respectively and a plurality of jumper terminals electrically extended from the jumper inlets respectively. The terminals switch includes a terminal circuit electrically connected with the jumper terminals of the jumper circuit for selectively switching the voice coils between a series connection and a parallel connection.

23 Claims, 6 Drawing Sheets

TERMINAL CONNECTION DEVICE FOR SPEAKER

BACKGROUND OF THE PRESENT INVENTION

1. Field of Invention

The present invention relates to a speaker, and more particularly to a terminal connection device connected to a speaker for selectively connecting the voice coils of the speaker between an internal series connection and an internal parallel connection.

2. Description of Related Arts

A conventional speaker, which is adapted for transferring electrical energy to sound energy, comprises a speaker frame having a hollow shaped frame body, a speaker cone held by the speaker frame, a voice coil having a pair of terminals provided at a rear side of the speaker frame to electrically connect to an amplifier. To operate the speaker, a magnet is coaxially disposed in the voice coil to generate magnetic field in a form of magnetic force. Due to the magnetic force, the voice coil is driven to move coaxially, so as to further drive the speaker cone to vibrate the surrounding air coaxially. So, the electrical energy will then transfer to the sound energy.

Accordingly, there are two individual voice coils supported in the speaker frame for a high-end speaker such that each of the voice coils generates different ranges of sound to enhance the sound effect of the speaker. However, such speaker has several drawbacks.

The voice coils must be internally connected in either series connection or parallel connection for different sound quality adjustment. For connecting the voice coils with the amplifier in series connection, the two voice coils must be electrically connected in series circuit by electrically connecting the negative terminal of one of the voice coils to the positive terminal of the other voice coil. For connecting the voice coils with the amplifier in parallel connection, the two voice coils must be electrically connected in parallel circuit by electrically connecting the negative terminal of once of the voice coils to the negative terminal of the other voice coil. Accordingly, the electrical connection of the two voice coils is not very complicated that the user is able to electrically wire the two voice coils by himself. However, it is a hassle for the user to disassemble the speaker to change the electrical connection of the speaker between the series circuit and the parallel circuit so as to adjust the sound quality with respect to the amplifier.

In addition, the practical difficulty of cable wiring becomes apparent. For electrically connecting between the voice coils, electric cables must be used externally connected the terminals of the voice coils so that the user is able to switch between the series connection and the parallel connection of the speaker with respect to the amplifier. In such circumstance, the externally electric cables not only interfere with other components of the speaker but also degrade aesthetic appearance of the speaker.

SUMMARY OF THE PRESENT INVENTION

A main object of the present invention is to provide a terminal connection device for a speaker, wherein the terminal connection device is internally connected with the speaker to selectively connect the voice coils of the speaker between an internal series connection and an internal parallel connection.

Another object of the present invention is to provide a terminal connection device for a speaker, wherein no electric cable is required to electrically wire between the voice coils so as to simplify the electrical configuration of the speaker incorporating with the terminal connection device.

Another object of the present invention is to provide a terminal connection device for a speaker, wherein the terminal connection device comprises a jumper housing electrically connected with the terminals of the voice coils and a terminal switch detachably mounted to the jumper housing to switch the voice coils of the speaker between the internal series connection and the internal parallel connection.

Another object of the present invention is to provide a terminal connection device for a speaker, wherein the jumper housing is internally connected with the voice coils to minimize the cumbersome electric cables required for external connection of the conventional speaker.

Another object of the present invention is to provide a terminal connection device for a speaker, wherein the user is able to easily switch between the internal series connection and the internal parallel connection of the voice coils by interchanging the positions of the jumper arms of the terminal switch with respect with the jumper housing.

Another object of the present invention is to provide a terminal connection device for a speaker, wherein which does not alter the original structural design of the speaker so that the present invention is adapted to incorporate with the conventional speaker having the terminals.

Accordingly, in order to accomplish the above objects, the present invention provides a terminal connection device for a speaker which comprises at least two voice coils each having two electric outputs, comprising:

a jumper housing comprising a jumper circuit defining a plurality of jumper inlets adapted for electrically connecting with the electric outputs of the voice coils respectively and a plurality of jumper terminals electrically extended from the jumper inlets respectively; and a terminal switch comprising a terminal circuit and a plurality of jumper arms electrically extended from the terminal circuit to detachably engage with the jumper terminals of the jumper housing so as to selectively connect the terminal circuit with the jumper circuit in an electrically connecting manner for selectively switching the voice coils between a series connection and a parallel connection.

These and other objectives, features, and advantages of the present invention will become apparent from the following detailed description, the accompanying drawings, and the appended claims.

DETAILED DESCRIPTION OF THE PREFERRED EMBODIMENT

Figure 1:
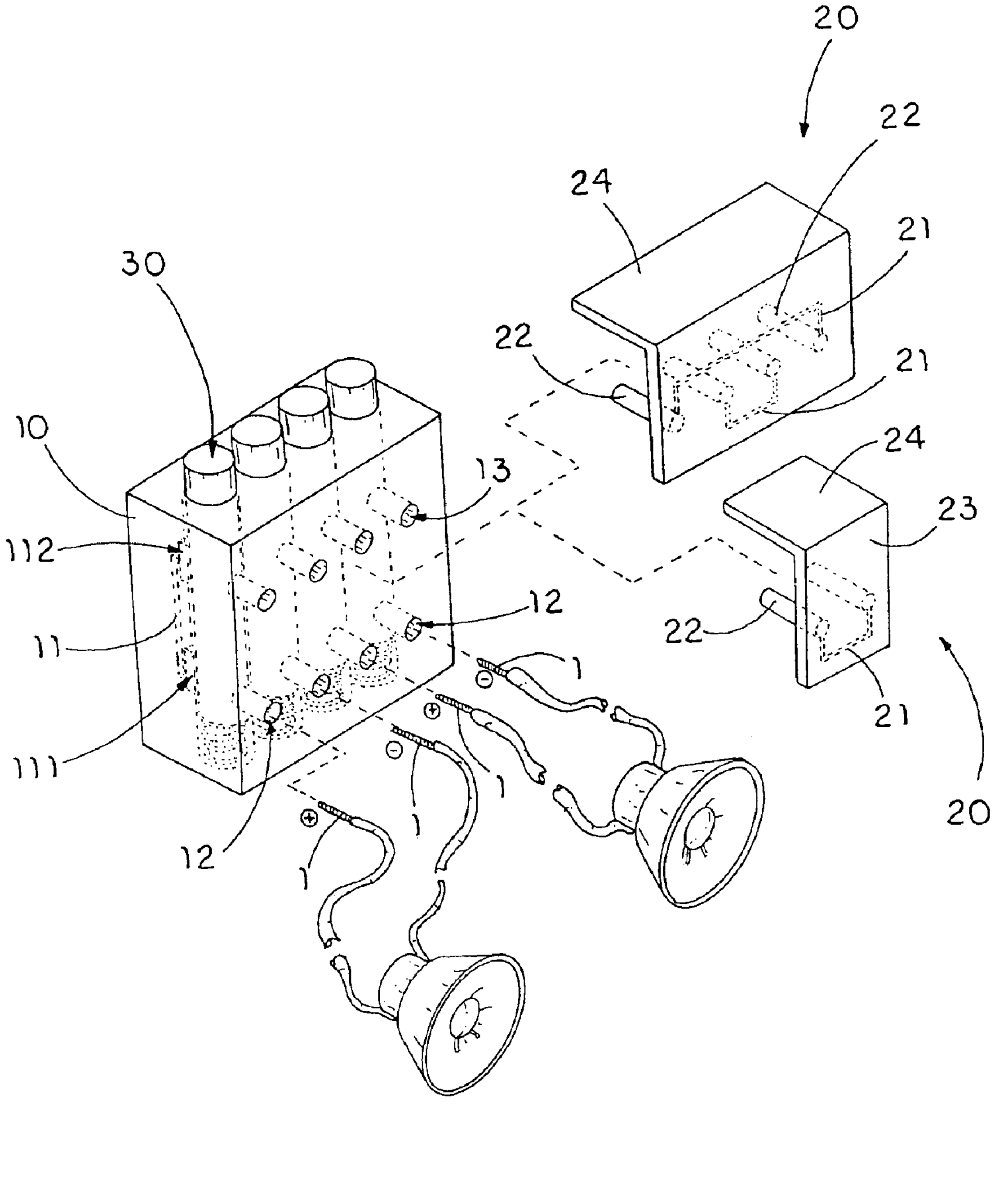
FIG. 1 is a perspective view of a terminal connection device for a speaker according to a preferred embodiment of the present invention.

Referring to FIG. 1 of the drawings, a terminal connection device for a speaker according to a preferred embodiment of the present invention is illustrated, wherein the speaker, such as a conventional speaker, comprises at least two voice coils each having two electric outputs I which is embodied as two conventional electric wire ends.

The terminal connection device comprises a jumper housing 10 and a terminal switch 20.

The jumper housing 10 comprises a jumper circuit 11 defining a plurality of jumper inlets 111 adapted for electrically connecting with the electric outputs 1 of the voice coils respectively and a plurality of jumper terminals 112 electrically extended from the jumper inlets 111 respectively.

The terminal switch 20, which is detachably mounted on the jumper housing 10, comprises a terminal circuit 21 electrically connected with the jumper terminals 112 of the jumper circuit 11 for selectively switching the voice coils between a series connection and a parallel connection.

According to the preferred embodiment, the jumper housing 10 is supported in a speaker frame of the speaker to internally connect with the electric outputs 1 of the voice coils. Accordingly, each of the voice coils comprises two electric outputs 1 which are embodied as a positive charged output and a negative charged output to electrically connect with the jumper inlets 111 of the jumper circuit 11 respectively.

The terminal switch 20 further comprises a plurality of jumper arms 22 electrically extended from the terminal circuit 21 to detachably engage with the jumper terminals 112 of the jumper housing 10 so as to selectively connect the terminal circuit 21 with the jumper circuit 11 in an electrically connecting manner.

As shown in FIG. 1, the jumper housing 10 has a plurality of input slots 12 alignedly and respectively extended to the jumper inlets 111 for slidably receiving the electric outputs 1 to electrically connect with the jumper inlets 111, and a plurality of jumper slots 13 alignedly and respectively extended to the jumper terminals 112, wherein the jumper arms 22 is detachably inserted into the jumper slots 13 to electrically connect with the jumper terminals 112 respectively.

The terminal switch 20 further comprises a supporting wall 23 supporting the terminal circuit 21 thereon wherein the jumper arms 22 are spacedly extended from the supporting wall 23 to align with the jumper terminals 112 in such a manner that when the supporting wall 23 is detachably mounted to the jumper housing 10 to electrically engage the jumper arms 22 with the jumper terminals 112 respectively, the terminal circuit 21 is electrically connected with the jumper circuit 11. In other words, the supporting wall 23 functions as a guider to align the jumper arms 22 with the jumper slots 13 respectively to enhance the jumper arms 22 to slidably insert into the jumper slots 13 respectively.

Each of the jumper arms 22 is made of conductive material, such as copper or aluminum, extended from the terminal circuit 21 in such a manner that when the jumper arms 22 are slidably inserted into the jumper slots 13 respectively, the terminal circuit 21 is electrically connected with the jumper circuit 11 through the jumper arms 22.

Figure 3:
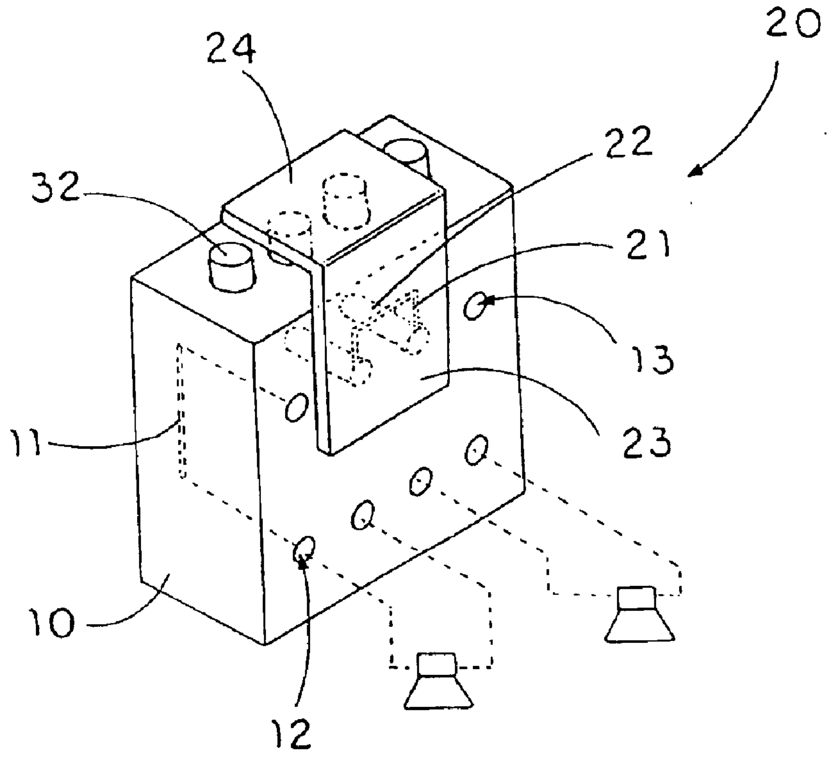
FIG. 3 is a perspective view of the terminal connection device to electrically connect the voice coils of the speaker in a series connection according to the above preferred embodiment of the present invention.
Figure 4:
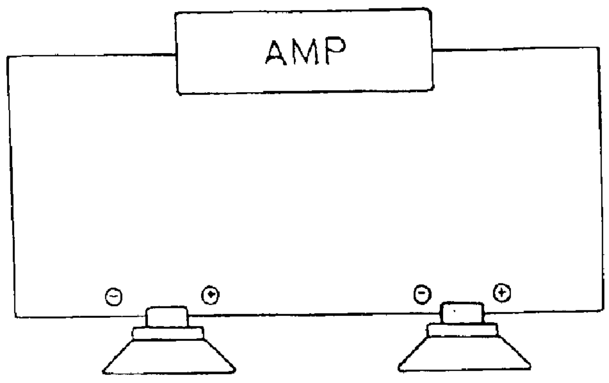
FIG. 4 is a circuit diagram of the terminal connection device to electrically connect the voice coils of the speaker in a series connection according to the above preferred embodiment of the present invention.

For example, in order to electrically connect the two voice coils in a series connection as shown in FIG. 4, two jumper arms 22, which are respectively embodied as two series connection jumper arms electrically connected in a series connection through the terminal circuit 21, are required to respectively insert into the two jumper slots 13 for electrically connecting the positive charged electric output 1 of one of the voice coils with the negative charged electric output of the other voice coil, as shown in FIG. 3. In other words, the two jumper arms 22 are electrically connected with each other through the terminal circuit 21.

Figure 6:
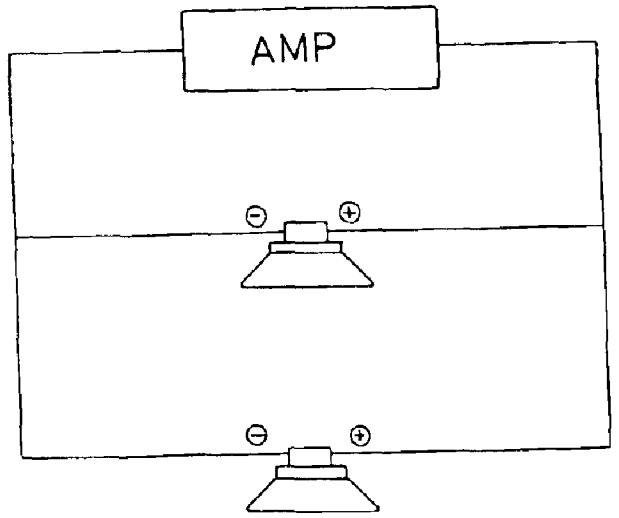
FIG. 6 is a circuit diagram of the terminal connection device to electrically connect the voice coils of the speaker in a parallel connection according to the above preferred embodiment of the present invention.

For electrically connecting the two voice coils in a parallel connection as shown in FIG. 6, four jumper arms 22, which are respectively embodied as four parallel connection jumper arms electrically connected in a parallel connection through the terminal circuit 21, are required to respectively insert into the four jumper slot 13 for electrically connecting the positive charged electric outputs 1 of the two voice coils together and the negative charged electric outputs 1 of the two voice coils together. In other words, two of the four jumper arms 22 are electrically connected together while another two jumper arms 22 are electrically connected together through the terminal circuit 21.

In other words, the electrical configuration of the voice coils of the speaker can be switched between a series connection and a parallel connection by simply inserting the jumper arms 22 into different jumper slots 13.

Figure 2:
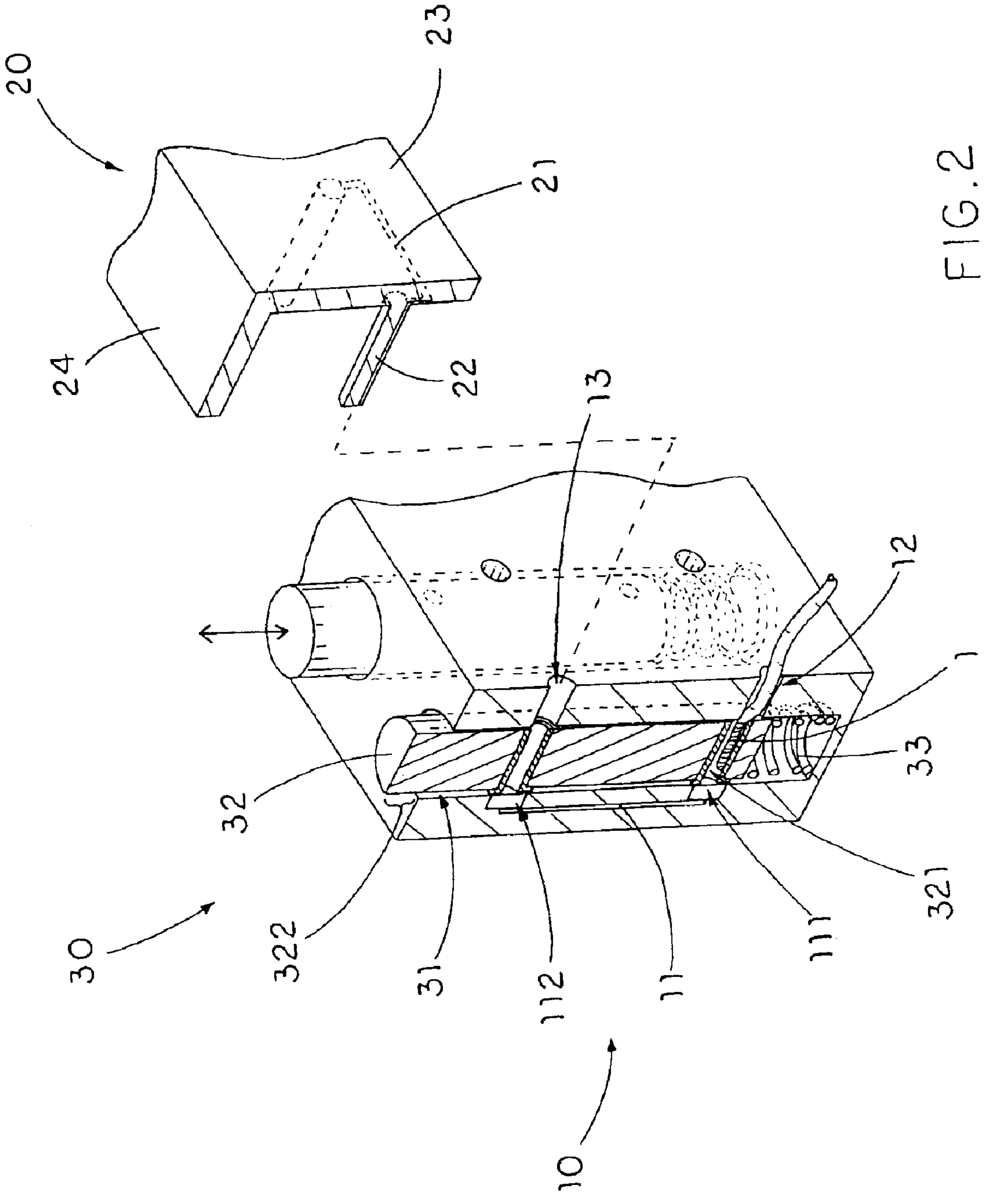
FIG. 2 is a sectional view of the terminal connection device for the speaker according to the above preferred embodiment of the present invention.

As shown in FIG. 2, the terminal connection device further comprises means 30 for securely locking the electric outputs 1 within the input slots 13, wherein the locking means 30 has a plurality of sliding channels 31 spacedly formed on the jumper housing 10 and comprises a plurality of pusher member 32, each having a guiding hole 321, slidably disposed in the sliding channels 31 to align the guiding holes 321 with the input slots 12 respectively for holding the electric outputs 1 of the voice coils therein.

According to the preferred embodiment, each of the pusher members 32 has a pusher portion 322 functions as a pusher button extended upwardly from the jumper housing 10 to drive the pusher member 32 sliding along the respective sliding channel 31 so as to align the guiding hole 321 with the respective input slot 12.

The locking means 30 further comprises a plurality of resilient elements 33 supported in the jumper housing 10 for applying urging forces against the pusher members 32 to push the guiding holes 321 offset from the input slots 12 respectively. As shown in FIG. 2, each of the resilient elements 33 is a compression spring having two ends biasing against the respective pusher member 32 and the jumper housing 10 to push the pusher member 32 to upwardly slide along the respective sliding channel 31, so as to offset the guiding hole 321 with the respective input slot 12.

In order to securely mount the electric output 1 of the voice coil to the jumper inlet 111, a downward pressing force is applied on the pusher portion 322 of the respective pusher member 32 so as to downwardly push the pusher member 32 along the sliding channel 31 until the guiding hole 321 is aligned with the input slot 12. At the same time, the electric output 1 of the voice coil is slidably inserted into the input slot 12 to electrically connect with the jumper inlet 111 through the guiding holes 321. Once, releasing the downwardly pressing force on the pusher portion 322, the compressed resilient element 33 pushes the pusher member 32 upwardly to offset the guiding hole 321 with the input slot 12, so as to lock up the electric output 1 within the input slot 12 to ensure the electric output 1 of the voice coil electrically connect with the jumper inlet 111.

Figure 5:
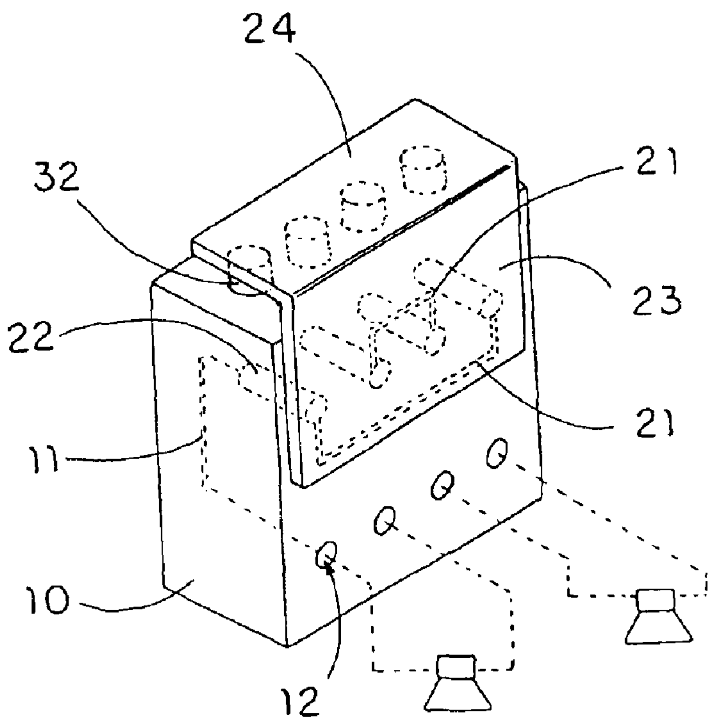
FIG. 5 is a perspective view of the terminal connection device to electrically connect the voice coils of the speaker in a parallel connection according to the above preferred embodiment of the present invention.

As shown in FIGS. 2, 3, and 5, the terminal switch 20 further comprises a sheltering cover 24 extended from the supporting wall 23 to shelter the pusher portions 322 of the pusher members 32 when the jumper arms 22 are slidably inserted into the input slots 13. It is worth to mention that when the jumper arms 22 are slidably inserted into the input slots 13 to electrically connect with the jumper inlet 111, the pusher portions 322 of the pusher members 32 are sheltered by the sheltering cover 24 to prevent an electrical disconnection between the electric output 1 of the voice coil and the jumper inlet 11 by accidentally pressing on the pusher portions 322 of the pusher members 32.

Figure 7:
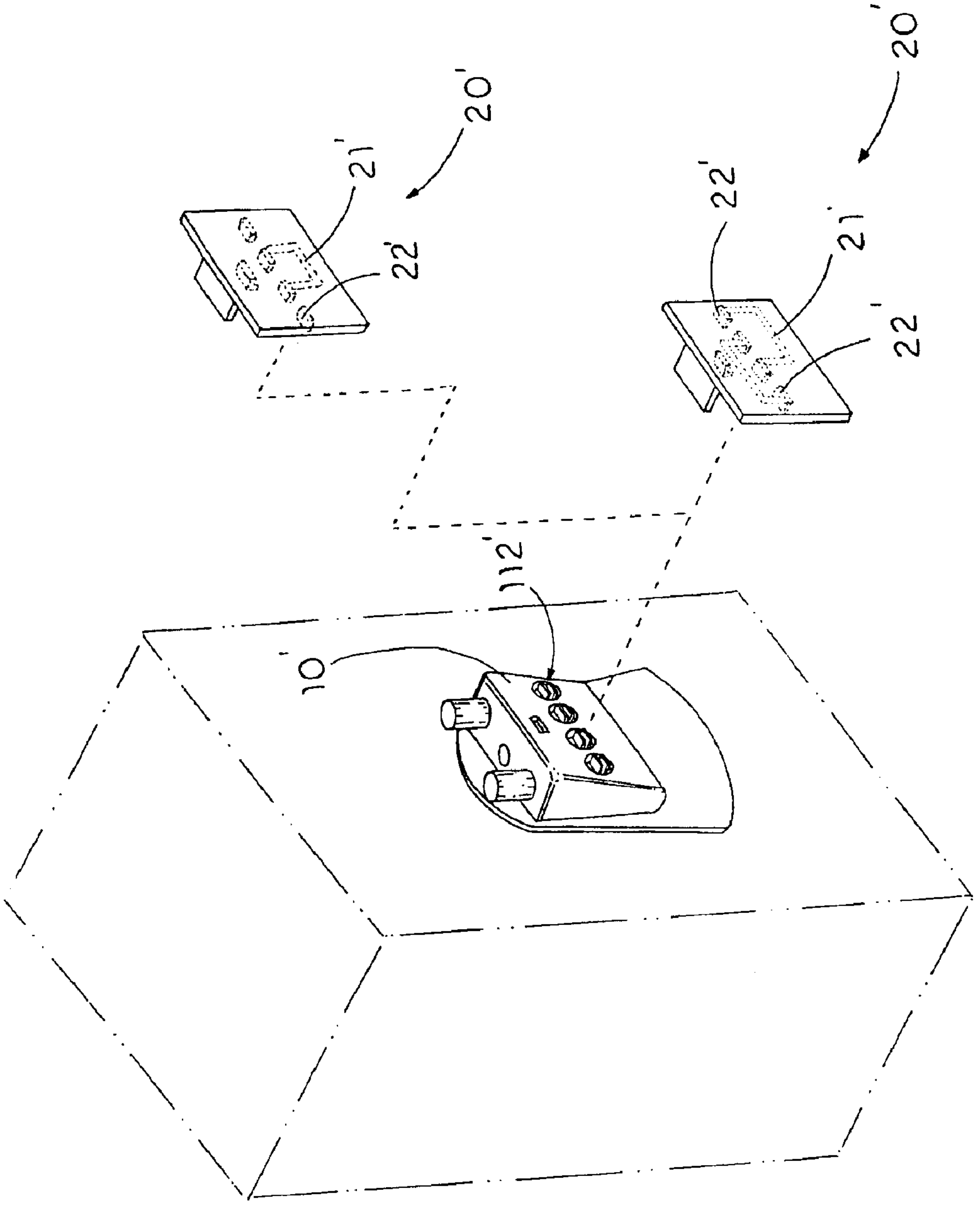
FIG. 7 illustrates an alternative mode of the terminal connection device mounting on the speaker according to the above preferred embodiment of the present invention.
Figure 8:
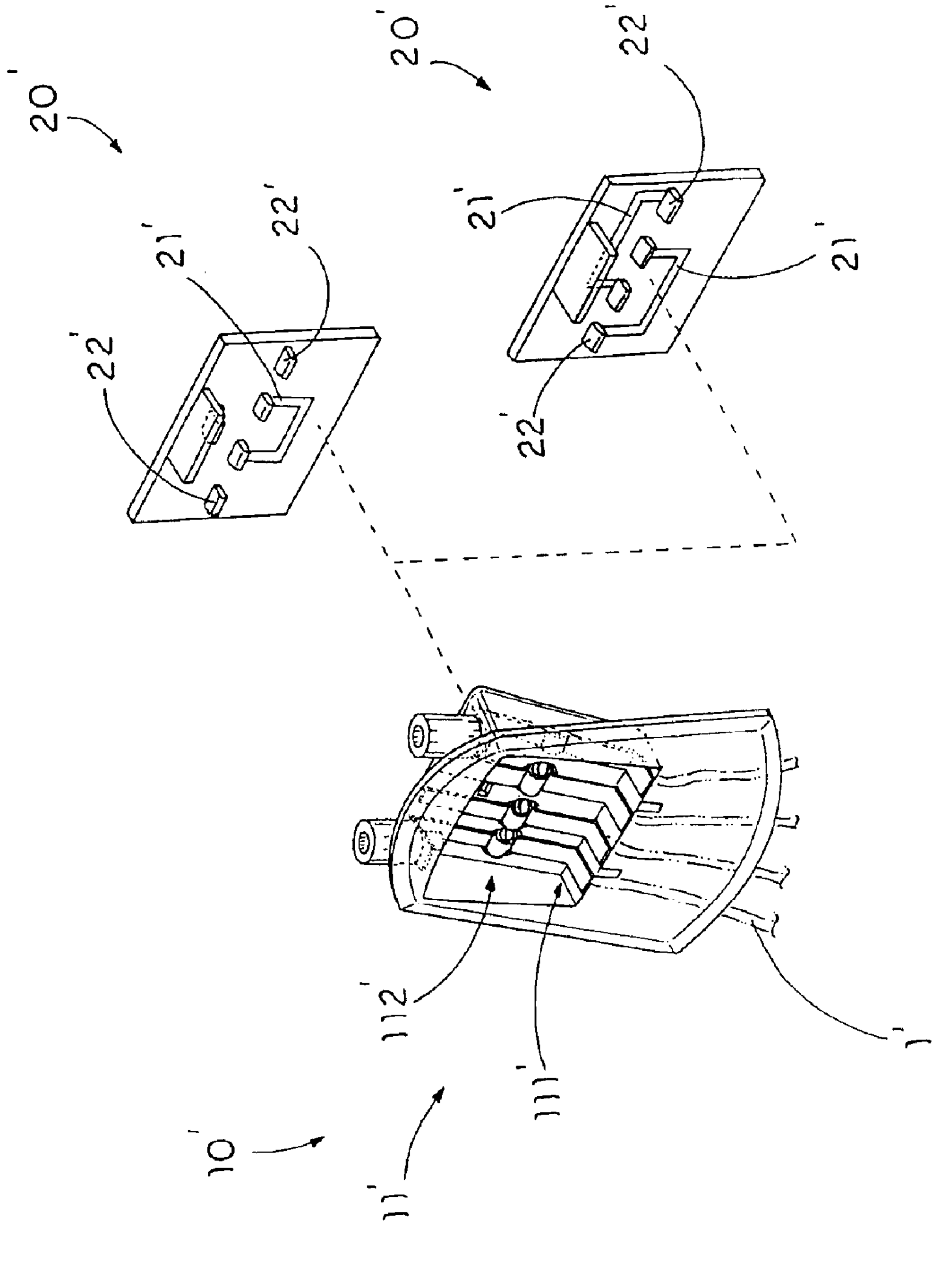
FIG. 8 illustrates the alternative mode of the terminal connection device electrically connected with the speaker according to the above preferred embodiment of the present invention.

FIGS. 7 and 8 illustrates an alternative mode of the terminal connection device, wherein the jumper inlets 111' of the jumper circuit 11' are spacedly formed at a rear side of the jumper housing 10' for electrically connecting with the electric outputs 1' of the voice coils respectively. The jumper terminals 112', which are spacedly provided at the front side of the jumper housing 10', are electrically extended from the jumper inlets 111' respectively.

Accordingly, the jumper housing 10' is adapted for affixing on a rear side of the speaker, as shown in FIG. 7, wherein the electric outputs 1' of the voice coils of the speaker are directly connected to the jumper inlets 111' of the jumper housing 10'. In other words, the jumper housing 10' can be built-in with the speaker to form an integral one-piece speaker.

Each of the jumper terminals 112' is embodied as a clipping member, having a U-shaped cross sectional, disposed at the respective jumper slot 13' to securely retain the jumper arm 22' in position so as to electrically connect the terminal circuit 21' of the terminal switch 20' with the jumper circuit 11' of the jumper housing 10'. In other words, when the jumper arms 22' are slidably inserted into the jumper slots 13' respectively, the jumper arms 22' are detachably clipped with the jumper terminals 112' respectively to electrically connect the jumper circuit 11' with the terminal circuit 21' so as to selectively switch the voice coils between a series connection and a parallel connection.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A terminal connection device for a speaker which comprises at least two voice coils each having two electric outputs, comprising:

a jumper housing comprising a jumper circuit defining a plurality of jumper inlets adapted for electrically connecting with said electric outputs of said voice coils respectively and a plurality of jumper terminals electrically extended from said jumper inlets respectively; and a terminal switch, which is detachably mounted on said jumper housing, comprising a terminal circuit electrically connected with said jumper terminals of said jumper circuit for selectively switching said voice coils between a series connection and a parallel connection.

2. The terminal connection device, as recited in claim 1, wherein said terminal switch further comprises two series connection jumper arms electrically extended from said terminal circuit to detachably connect to said jumper terminals so as to electrically connect said terminal circuit with said jumper circuit for switching said voice coils in said series connection.

3. The terminal connection device, as recited in claim 2, wherein said jumper housing further has a plurality of input slots alignedly and respectively extended to said jumper inlets for slidably receiving said electric outputs to electrically connect with said jumper inlets, and a plurality of jumper slots alignedly and respectively extended to said jumper terminals, wherein said jumper arms is detachably inserted into said jumper slots to electrically connect with said jumper terminals respectively.

4. The terminal connection device, as recited in claim 2, wherein said series connection jumper arms are electrically connected in a series connection through said terminal circuit, wherein one of said series connection jumpers is arranged for electrically connecting with said positive charged electric output of one of said voice coils and another said series connection jumpers is arranged for electrically connecting with said negative charged electric output of another said voice coil.

5. The terminal connection device, as recited in claim 4, wherein each of said jumper arms is made of conductive material to electrically connect said terminal circuit with said jumper circuit.

6. The terminal connection device, as recited in claim 5, wherein each of said jumper terminals comprises a clipping member detachably clipping said respective jumper arm in position so as to electrically connect said terminal circuit of said terminal switch with said jumper circuit of said jumper housing.

7. The terminal connection device, as recited in claim 4, wherein said jumper housing further has a plurality of input slots alignedly and respectively extended to said jumper inlets for slidably receiving said electric outputs to electrically connect with said jumper inlets, and a plurality of jumper slots alignedly and respectively extended to said jumper terminals, wherein said jumper arms is detachably inserted into said jumper slots to electrically connect with said jumper terminals respectively.

8. The terminal connection device, as recited in claim 4, wherein said terminal switch further comprises a supporting wall supporting said terminal circuit thereon, wherein said jumper arms are spacedly extended from said supporting wall to align with said jumper terminals in such a manner that when said supporting wall is detachably mounted to said jumper housing to electrically engage said jumper arms with said jumper terminals respectively, said terminal circuit is electrically connected with said jumper circuit.

9. The terminal connection device, as recited in claim 1, wherein said terminal switch further comprises four parallel jumper arms electrically extended from said terminal circuit to detachably connect to said jumper terminals so as to electrically connect said terminal circuit with said jumper circuit for switching said voice coils in said parallel connection.

10. The terminal connection device, as recited in claim 9, wherein said parallel jumper arms electrically connected in a parallel connection through said terminal circuit, wherein two of said corresponding parallel connection jumpers are arranged for electrically connecting with said positive charged electric outputs of two of said voice coils and another said two corresponding parallel connection jumpers are arranged for electrically connecting with said negative charged electric outputs of another said two voice coils.

11. The terminal connection device, as recited in claim 10, wherein each of said jumper arms is made of conductive material to electrically connect said terminal circuit with said jumper circuit.

12. The terminal connection device, as recited in claim 11, wherein each of said jumper terminals comprises a clipping member detachably clipping said respective jumper arm in position so as to electrically connect said terminal circuit of said terminal switch with said jumper circuit of said jumper housing.

13. The terminal connection device, as recited in claim 10, wherein said jumper housing further has a plurality of input slots alignedly and respectively extended to said jumper inlets for slidably receiving said electric outputs to electrically connect with said jumper inlets, and a plurality of jumper slots alignedly and respectively extended to said jumper terminals, wherein said jumper arms is detachably inserted into said jumper slots to electrically connect with said jumper terminals respectively.

14. The terminal connection device, as recited in claim 13, wherein said terminal switch further comprises a supporting wall supporting said terminal circuit thereon, wherein said jumper arms are spacedly extended from said supporting wall to align with said jumper terminals in such a manner that when said supporting wall is detachably mounted to said jumper housing to electrically engage said jumper arms with said jumper terminals respectively, said terminal circuit is electrically connected with said jumper circuit.

15. The terminal connection device, as recited in claim 14, further comprising locking means which has a plurality of sliding channels spacedly formed on said jumper housing and comprises a plurality of pusher member, each having a pusher portion and a guiding hole, slidably disposed in said sliding channels to align said guiding holes with said input slots respectively for holding said electric outputs of said voice coils therein, and a plurality of resilient elements supported in said jumper housing for applying urging forces against said pusher members to push said guiding holes offset from said input slots respectively for securely locking said electric outputs within said input slots to electrically connect with said jumper inlets respectively.

16. The terminal connection device, as recited in claim 15, wherein said terminal switch further comprises a sheltering cover extended from said supporting wall to shelter said pusher portions of said pusher members when said jumper arms are slidably inserted into said input slots.

17. The terminal connection device, as recited in claim 13, further comprising locking means which has a plurality of sliding channels spacedly formed on said jumper housing and comprises a plurality of pusher member, each having a pusher portion and a guiding hole, slidably disposed in said sliding channels to align said guiding holes with said input slots respectively for holding said electric outputs of said voice coils therein, and a plurality of resilient elements supported in said jumper housing for applying urging forces against said pusher members to push said guiding holes offset from said input slots respectively for securely locking said electric outputs within said input slots to electrically connect with said jumper inlets respectively.

18. The terminal connection device, as recited in claim 10, wherein said terminal switch further comprises a supporting wall supporting said terminal circuit thereon, wherein said jumper arms are spacedly extended from said supporting wall to align with said jumper terminals in such a manner that when said supporting wall is detachably mounted to said jumper housing to electrically engage said jumper arms with said jumper terminals respectively, said terminal circuit is electrically connected with said jumper circuit.

19. The terminal connection device, as recited in claim 9, wherein said jumper housing further has a plurality of input slots alignedly and respectively extended to said jumper inlets for slidably receiving said electric outputs to electrically connect with said jumper inlets, and a plurality of jumper slots alignedly and respectively extended to said jumper terminals, wherein said jumper arms is detachably inserted into said jumper slots to electrically connect with said jumper terminals respectively.

20. The terminal connection device, as recited in claim 19, wherein said terminal switch further comprises a supporting wall supporting said terminal circuit thereon, wherein said jumper arms are spacedly extended from said supporting wall to align with said jumper terminals in such a manner that when said supporting wall is detachably mounted to said jumper housing to electrically engage said jumper arms with said jumper terminals respectively, said terminal circuit is electrically connected with said jumper circuit.

21. The terminal connection device, as recited in claim 20, further comprising locking means which has a plurality of sliding channels spacedly formed on said jumper housing and comprises a plurality of pusher member, each having a pusher portion and a guiding hole, slidably disposed in said sliding channels to align said guiding holes with said input slots respectively for holding said electric outputs of said voice coils therein, and a plurality of resilient elements supported in said jumper housing for applying urging forces against said pusher members to push said guiding holes offset from said input slots respectively for securely locking said electric outputs within said input slots to electrically connect with said jumper inlets respectively.

22. The terminal connection device, as recited in claim 21, wherein said terminal switch further comprises a sheltering cover extended from said supporting wall to shelter said pusher portions of said pusher members when said jumper arms are slidably inserted into said input slots.

23. The terminal connection device, as recited in claim 19, further comprising locking means which has a plurality of sliding channels spacedly formed on said jumper housing and comprises a plurality of pusher member, each having a pusher portion and a guiding hole, slidably disposed in said sliding channels to align said guiding holes with said input slots respectively for holding said electric outputs of said voice coils therein, and a plurality of resilient elements supported in said jumper housing for applying urging forces against said pusher members to push said guiding holes offset from said input slots respectively for securely locking said electric outputs within said input slots to electrically connect with said jumper inlets respectively.

* * * * *